Patented Jan. 31, 1939

2,145,273

UNITED STATES PATENT OFFICE 2,145,273

PREPARATION OF CELLULOSE ETHERS

Floyd C. Peterson, Syracuse, N. Y., and Arthur J. Barry, Midland, Mich., assignors to The Dow Chemical Company, Midland, Mich., a corporation of Michigan No Drawing. Application January 29, 1938, Serial No. 187,654

15 Claims. (Cl. 260—152)

This invention relates to a process for the preparation of cellulose ethers, and especially to such a process carried out in the presence of anhydrous liquid ammonia.

In the customary methods for preparation of cellulose ethers, cellulose is treated with sodium hydroxide or equivalent alkali, either in the form of a concentrated aqueous solution or by mixing the cellulose with solid sodium hydroxide and an amount of water insufficient in itself to dissolve all of the alkali. The alkali cellulose is usually pressed to remove some of the excess alkali solution, or it may be aged to effect a viscosity reduction without any squeezing step having been employed. In all such processes there is left a substantial molecular excess of alkali over the theoretical amount necessary to effect the etherification reaction. The alkali cellulose product so formed is subjected to the action of an etherifying agent such as an alkyl halide, alkyl sulphate, arakyl halide, or the like, preferably at elevated temperatures, usually in the range from about 90° to 120° C., and for periods of time varying from 6 to 24 hours or longer. The amount of etherifying agent required is usually far in excess of the theoretical amount necessary to react with the alkali in the alkali cellulose. Such processes, then, result necessarily in the formation of inordinately large quantities of undesirable by-products formed by the side reaction between the excess alkali present and the etherifying agent. Such by-products are usually alcohols or ethers which are not adapted to further employment as etherifying agents. It is well known that, as the water content of the alkali cellulose is reduced, the efficiency of the alkylating agent is increased. The schemes of the prior art, however, lead to non-uniformly etherified celluloses, which dissolve incompletely in solvents to form highly gelatinous solutions.

It is an object of the present invention to provide a process whereby cellulose ethers may be prepared from alkali metal cellulosates in liquid ammonia as the reaction medium. It is a further object to provide a process whereby alkali metal cellulosates may be prepared from which poly-substituted cellulose ethers may be derived without conversion of etherifying agents into undesirable by-products. It is another object of the invention to provide a process for the preparation of cellulose ethers in an anhydrous medium without employing sodium hydroxide and without the intermediate formation of an addition compound such as alkali cellulose.

We have now found that when substantially anhydrous cellulose, e. g., vacuum-dried cellulose, is suspended in liquid ammonia and treated with an alkali metal amide, preferably sodium amide, there is readily produced an alkali metal cellulosate by simple exchange between the alkali metal in the amide and hydroxyl hydrogen in the cellulose. The reaction between cellulose or partially etherified cellulose and alkali metal amides is similar in its effect to the reaction between such materials and sodium hydroxide in the well known preparation of alkali cellulose. The alkali metal amides effect a swelling of the cellulosic fiber and apparently make possible a higher degree of etherification than is obtained when such cellulosic materials are acted upon directly by the alkali metals themselves. The reaction between the alkali metal amide and the cellulose progresses to substantial completion when only a relatively slight excess over the theoretical amount of the amide is employed. For example, a tri-metallic cellulosate may be produced by reacting cellulose with about 4 molecular proportions of an alkali metal amide in liquid ammonia medium, the cellulose molecule being calculated on the basis of the unit formula, $C_6H_{10}O_5$. Since each cellulose unit has 3 etherifiable hydroxyl groups, the theoretical amount of amide would be 3 moles per unit of cellulose. The excess amide appears to exert a swelling effect on the cellulose fiber. By suitable variation of the amount of alkali metal amide employed, mono- or di-metallic cellulosates may be prepared. The reaction between the alkali metal amide and cellulose or partially etherified cellulose is conducted at any temperature below the boiling point of liquid ammonia at the pressure (1 to 10 atmospheres) employed, e. g. below —33° C. at atmospheric pressure and up to about 25° C. at 10 atmospheres pressure. We have carried out the reaction at temperatures as low as —80° C. at atmospheric pressure and find it to work satisfactorily. Higher temperatures, e. g. —20° to +20° C., may be employed by application of super-atmospheric pressure. Ammonia at temperatures of about —20° C. causes greater swelling of the cellulose than at —33° C. and should give the sodium in sodium amide a better chance to react with all of the hydroxyl groups in the cellulosic fiber than when the reaction is carried on at lower temperatures.

Commercially available sodium amide may be employed in the reaction, but we have found that freshly prepared alkali metal amides are somewhat more reactive than the commercial products. Such amides may be prepared in the well known manner by adding alkali metal to liquid ammonia in the presence of catalytic quantities of iron, ferrous or ferric oxide, ferrous or ferric salts, or nickel salts. Ferric salts are the most efficient catalysts for the reaction. If desired, the reaction may be carried out in iron equipment employing the iron surface exposed to liquid ammonia as the catalyst in the amide formation. The metal amide is usually formed within from 2 to 3 hours after the alkali metal has been added to the liquid ammonia. This may be proven by the disappearance of the characteristic blue color of metallic sodium dispersed in ammonia as well as by measurement of the amount of hydrogen evolved from the reaction between the alkali metal and ammonia.

After the alkali metal amide has been formed substantially anhydrous cellulose, preferably in finely divided form, is added to the solution of the amide in ammonia. The ammonia is slowly distilled from the system over a period of from 4 to 20 hours while the temperature therein gradually increases from below −33° C. to about room temperature, i. e. to about 25° C. Sufficient liquid ammonia is retained in the reaction vessel to keep the alkali metal cellulosate, so formed, in a moist condition. It is to be understood that the expression "moist" employed above relates not to an aqueous condition but rather to one wherein the moistening agent is anhydrous liquid ammonia.

The alkali metal cellulosate in liquid ammonia is next treated with from 1 to 10, and preferably about 3, equivalent weights of etherifying agent per equivalent of alkali metal employed in the preparation of the amide. At this stage we prefer to add to the reaction mixture a liquid aromatic hydrocarbon which is inert to ammonia and cellulose, substantially inert to the action of alkali metal amides, and which is a solvent or swelling agent for cellulose ethers. Suitable examples of such hydrocarbons are the liquid aromatic hydrocarbons such as benzene, toluene, xylene, para-cymene, and mesitylene. Such hydrocarbons, even though immiscible with the liquid ammonia, serve as dispersion agents for the cellulose ether formed during the reaction.

The etherification reaction is carried out over a period of from 3 to 20 hours or more, depending upon the etherifying agent employed, the temperature of the reaction, and the number of atoms of alkali metal substituted in the cellulose molecule. We prefer to carry out this stage of the reaction while the liquid ammonia is being allowed to volatilize slowly away from the reaction mixture. Thus, when etherification starts, the temperature may be at or below 0° C., and the pressure correspondingly may be 5 atmospheres or less, and when etherification is complete the temperature of the reaction mixture may have risen to approximately room temperature, i. e. to about 25° C., and the pressure is atmospheric.

We have found that, owing to the low temperature employed in the etherification, side reactions between ammonia or the sodium amide and the etherifying agent are reduced to a minimum. For example, when ethyl bromide is employed as the etherifying agent, no appreciable amount of ethylene, butane, or ethyl amine was detected in the gases escaping from the reaction mixture.

After reaction is complete and the mixture has finally attained room temperature, the cellulose ether may be recovered according to any one of several methods. One satisfactory procedure is to discharge the reaction mixture into boiling water while the mixture is still slightly alkaline, thus flashing off unreacted etherifying agent, if this material has a boiling point below that of water, as well as volatilizing any small amount of amine which may have been formed as a byproduct, and steam distilling from the mixture any hydrocarbon which may have been employed as a dispersion medium for the etherification reaction. Another procedure whereby we recover the cellulose ether involves shaking the material with a cellulose ether solvent such as a mixture of 67 parts of benzene and 33 parts of methanol, or a mixture of 80 parts of toluene and 20 parts of ethanol, by volume, and filtering the mixture to remove most of the salt formed during the reaction and any suspended partially or wholly unetherified cellulose which may remain therein. The clear filtrate may be worked up according to well known procedures.

The following example illustrates the practice of our invention:

*Example*

17.3 parts by weight of sodium was dissolved in 500 parts of anhydrous liquid ammonia in a closed vessel. To the mixture was added 0.25 part of ferric nitrate as a catalyst. The mixture was agitated and after about 2 to 3 hours all of the blue color of sodium had disappeared, showing that the preparation of sodium amide was complete. To the solution of sodium amide in liquid ammonia was added 30 parts by weight of finely divided anhydrous cellulose. The ammonia was allowed to distill slowly from the reaction vessel over a period of from 4 to 20 hours until only enough liquid ammonia remained in the reaction mixture to wet the sodium cellulosate. The material remaining in the reactor was again cooled to below −33° C. and there was added 100 parts by weight of toluene and 330 parts by weight of ethyl bromide. The reaction mixture was again allowed to warm up gradually to about room temperature. This ordinarily requires from about 5 to 20 hours or longer, depending upon the volume of material present, the initial temperature of the mixture, etc. The reaction product was removed from the vessel and stirred into a body of boiling water to dissolve out salts formed during the reaction and to flash off volatile materials such as the excess ethyl bromide. The toluene employed as a dispersion medium for the etherification reaction was steam distilled during this step. The ethyl cellulose formed was redissolved in an organic solvent, filtered, and the clear solution again stirred into hot water. The precipitated product was a porous, granular ethyl cellulose having an ethoxyl content of 46.7 per cent.

The invention has been illustrated with respect to the use of sodium amide in the preparation of the alkali metal cellulosate from which the cellulose ethers are derived. Other alkali metal amides, e. g. potassium amide and lithium amide, may be similarly employed. Sodium amide appears to be the most reactive and is at present the most economically feasible compound of this type, and we prefer, therefore, to employ it in the reaction.

The example given above shows the use of toluene as a dispersing agent during the etherification step. A number of runs have been made wherein other hydrocarbons were employed. We have found, for example, that liquid aromatic hydrocarbons which are solvents or swelling agents for cellulose ethers, may be employed in the reaction. Such materials include benzene, toluene, xylene, ethyl benzene, cymene, and mesitylene. These and similar hydrocarbons serve to assist in the etherification reaction even though they are immiscible with liquid ammonia. The aromatic hydrocarbons, being swelling agents for partially etherified cellulose and solvents for the higher etherification products, either swell the fiber on the surface of which initial etherification has occured or dissolve therefrom such of the ether product as is sufficiently substituted to be readily soluble. This allows the etherifying agent to have access to the rest of the cellulosate fiber and results ultimately in the production of an etherified product having substantially as high a degree of substitution in the molecule as is obtained in the customary processes for the preparation of cellulose ethers from alkali cellulose.

Etherifying agents other than the ethyl bromide shown in the foregoing example may be employed with equivalent success. Such agents include, for example, methyl bromide, methyl iodide, ethyl chloride, ethyl iodide, normal propyl chloride, normal butyl chloride, dimethyl sulphate, diethyl sulphate, halo-alkyl ethers, and similar common etherifying agents. Other etherifying agents which may be employed are the nitro, nitroso, amino, and other substitution products of those agents previously named, wherein the substituent group is inert to the action of anhydrous ammonia and sodium amide under reaction conditions.

Instead of distilling or evaporating a large proportion of the ammonia from the reaction mixture prior to the addition of the etherifying agent, all or most of the ammonia may be left therein. Such a process tends to produce more by-product by interaction of ammonia and the etherifying agent than does the one set forth above. If, however, the temperature of etherification be maintained through the initial stages of the reaction at a temperature below about −50° C., the formation of by-products, such as amines, is minimized.

Other modes of applying the principle of our invention may be employed instead of those explained, change being made as regards the method and material herein disclosed, provided the step or reactants stated by any of the following claims, or the equivalent of such stated steps or reactants, be employed.

We therefore particularly point out and distinctly claim as our invention:

1. The process which comprises reacting cellulose with an alkali metal amide in a medium of liquid ammonia.

2. The process which comprises reacting substantially anhydrous cellulose with sodium amide in a medium of anhydrous liquid ammonia.

3. The process which comprises reacting substantially anhydrous cellulose with an alkali metal amide in a medium of anhydrous liquid ammonia at a temperature below about 25° C. and under the vapor pressure of liquid ammonia corresponding to the temperature employed.

4. The process which comprises reacting substantially anhydrous cellulose with an alkali metal amide in a medium of anhydrous liquid ammonia at a temperature below about 25° C. and under the vapor pressure of liquid ammonia corresponding to the temperature employed, for a period of between about 4 and about 20 hours.

5. The process which comprises reacting substantially anhydrous cellulose with up to about 4 moles of an alkali metal amide per unit of cellulose in a medium of anhydrous liquid ammonia.

6. The process which comprises reacting substantially anhydrous cellulose with sodium amide in a medium of anhydrous liquid ammonia at atmospheric pressure and at a temperature below about −33° C.

7. The process which comprises reacting substantially anhydrous cellulose with up to about 4 moles of sodium amide per unit of cellulose in a medium of anhydrous liquid ammonia at a temperature up to about 25° C. and under the vapor pressure of liquid ammonia at the temperature employed.

8. The process which comprises reacting substantially anhydrous cellulose with an alkali metal amide in a medium comprising anhydrous liquid ammonia, adding an etherifying agent in amount equal to between about 1 and about 10 equivalents thereof per atom of alkali metal originally present as alkali metal amide, and allowing the reaction to proceed until the alkali metal present is converted to an alkali metal salt of the acid radical present in the etherifying agent.

9. The process which comprises reacting substantially anhydrous cellulose with an alkali metal amide in a medium of anhydrous liquid ammonia for a period of between about 4 and about 20 hours, adding an etherifying agent in about 1 and about 10 equivalents thereof per atom of alkali metal originally present as alkali metal amide, while allowing the ammonia to vaporize gradually from the reaction mixture.

10. The process which comprises reacting substantially anhydrous cellulose with between about 1 and about 4 equivalents of an alkali metal amide per anhydro-glucose unit in the cellulose employed, in a medium comprising anhydrous liquid ammonia, adding an etherifying agent in amount equal to between about 1 and about 10 equivalents thereof per atom of alkali metal originally present as alkali metal amide, and allowing the reaction to proceed until the alkali metal present is substantially completely converted to an alkali metal salt.

11. The process which comprises reacting substantially anhydrous cellulose with between about 1 and about 4 equivalents of an alkali metal amide per anhydro-glucose unit in the cellulose employed, in a medium comprising anhydrous liquid ammonia, for a period of between about 4 and about 20 hours, adding a liquid aromatic hydrocarbon and an etherifying agent to the so-formed alkali metal cellulosate suspension, the amount of etherifying agent being between about 1 and about 10 equivalents thereof per mole of alkali metal amide employed in the preparation of the alkali metal cellulosate, and allowing the reaction to proceed until the alkali metal present is substantially completely converted to an alkali metal salt of the acid radical present in the etherifying agent.

12. The process which comprises reacting substantially anhydrous cellulose with between about 1 and about 4 equivalents of an alkali metal amide per anhydro-glucose unit in the cellulose employed, in a medium comprising anhydrous liquid ammonia, evaporating off most of the ammonia from the so-formed alkali metal cellulosate, retaining enough of the ammonia, however, to keep the reaction product moistened therewith, adding a liquid aromatic hydrocarbon and an etherifying agent, the amount of etherifying agent being between about 1 and about 10 equivalents per atom of alkali metal in the alkali metal cellulosate, allowing the reaction to proceed until said alkali metal is substantially completely converted to the alkali metal salt of the acid radical in the etherifying agent, and allowing most of the remaining liquid ammonia to evaporate from the reaction mixture during the etherification step.

13. The process which comprises reacting substantially anhydrous cellulose with between about 1 and about 4 equivalents of sodium amide per anhydro-glucose unit in the cellulose employed, in a medium comprising anhydrous liquid ammonia evaporating off most of the ammonia from the so-formed sodium cellulosate, retaining enough of the ammonia, however, to keep the reaction product moistened therewith, adding a liquid aromatic hydrocarbon and an etherifying agent, the amount of etherifying agent being between about 1 and about 10 equivalents per atom of sodium in the sodium cellulosate, allowing the reaction to proceed until said sodium is substantially completely converted to the sodium salt of the acid radical in the etherifying agent, and allowing most of the remaining liquid ammonia to evaporate from the reaction mixture during the etherification step.

14. The process which comprises reacting substantially anhydrous cellulose with between about 1 and about 4 equivalents of sodium amide per anhydro-glucose unit in the cellulose employed in a medium comprising anhydrous liquid ammonia, evaporating off most of the ammonia from the so-formed sodium cellulosate, retaining enough of the ammonia, however, to keep the reaction product moistened therewith, adding a liquid aromatic hydrocarbon and ethyl bromide, the amount of ethyl bromide being between about 1 and about 10 equivalents per atom of sodium in the sodium cellulosate, allowing the reaction to proceed until said sodium is substantially completely converted to sodium bromide, and allowing most of the remaining liquid ammonia to evaporate from the reaction mixture during the etherification step.

15. The process which comprises reacting substantially anhydrous cellulose with between about 1 and about 4 equivalents of sodium amide per anhydro-glucose unit in the cellulose employed, in a medium comprising anhydrous liquid ammonia, evaporating off most of the ammonia from the so-formed sodium cellulosate, retaining enough of the ammonia, however, to keep the reaction moistened therewith, adding toluene and ethyl bromide, the amount of ethyl bromide being between about 1 and about 10 equivalents per atom of sodium in the sodium cellulosate, allowing the reaction to proceed until said sodium is substantially completely converted to sodium bromide, and allowing most of the remaining liquid ammonia to evaporate from the reaction mixture during the etherification step.

FLOYD C. PETERSON.
ARTHUR J. BARRY.

DISCLAIMER 2,145,273.—*Floyd C. Peterson*, Syracuse, N. Y., and *Arthur J. Barry*, Midland, Mich. PREPARATION OF CELLULOSE ETHERS. Patent dated January 31, 1939. Disclaimer filed March 12, 1941, by the assignee, *The Dow Chemical Company*.

Hereby enters this disclaimer to claims 1, 2, 3, and 6 of the above-identified patent.

[*Official Gazette April 8, 1941.*]

fying agent being between about 1 and about 10 equivalents per atom of alkali metal in the alkali metal cellulosate, allowing the reaction to proceed until said alkali metal is substantially completely converted to the alkali metal salt of the acid radical in the etherifying agent, and allowing most of the remaining liquid ammonia to evaporate from the reaction mixture during the etherification step.

13. The process which comprises reacting substantially anhydrous cellulose with between about 1 and about 4 equivalents of sodium amide per anhydro-glucose unit in the cellulose employed, in a medium comprising anhydrous liquid ammonia evaporating off most of the ammonia from the so-formed sodium cellulosate, retaining enough of the ammonia, however, to keep the reaction product moistened therewith, adding a liquid aromatic hydrocarbon and an etherifying agent, the amount of etherifying agent being between about 1 and about 10 equivalents per atom of sodium in the sodium cellulosate, allowing the reaction to proceed until said sodium is substantially completely converted to the sodium salt of the acid radical in the etherifying agent, and allowing most of the remaining liquid ammonia to evaporate from the reaction mixture during the etherification step.

14. The process which comprises reacting substantially anhydrous cellulose with between about 1 and about 4 equivalents of sodium amide per anhydro-glucose unit in the cellulose employed in a medium comprising anhydrous liquid ammonia, evaporating off most of the ammonia from the so-formed sodium cellulosate, retaining enough of the ammonia, however, to keep the reaction product moistened therewith, adding a liquid aromatic hydrocarbon and ethyl bromide, the amount of ethyl bromide being between about 1 and about 10 equivalents per atom of sodium in the sodium cellulosate, allowing the reaction to proceed until said sodium is substantially completely converted to sodium bromide, and allowing most of the remaining liquid ammonia to evaporate from the reaction mixture during the etherification step.

15. The process which comprises reacting substantially anhydrous cellulose with between about 1 and about 4 equivalents of sodium amide per anhydro-glucose unit in the cellulose employed, in a medium comprising anhydrous liquid ammonia, evaporating off most of the ammonia from the so-formed sodium cellulosate, retaining enough of the ammonia, however, to keep the reaction moistened therewith, adding toluene and ethyl bromide, the amount of ethyl bromide being between about 1 and about 10 equivalents per atom of sodium in the sodium cellulosate, allowing the reaction to proceed until said sodium is substantially completely converted to sodium bromide, and allowing most of the remaining liquid ammonia to evaporate from the reaction mixture during the etherification step.

FLOYD C. PETERSON.
ARTHUR J. BARRY.

DISCLAIMER 2,145,273.—*Floyd C. Peterson*, Syracuse, N. Y., and *Arthur J. Barry*, Midland, Mich. PREPARATION OF CELLULOSE ETHERS. Patent dated January 31, 1939. Disclaimer filed March 12, 1941, by the assignee, *The Dow Chemical Company*.

Hereby enters this disclaimer to claims 1, 2, 3, and 6 of the above-identified patent.

[*Official Gazette April 8, 1941.*]